(12) United States Patent
Dhand et al.

(10) Patent No.: US 8,769,616 B2
(45) Date of Patent: *Jul. 1, 2014

(54) AUTHENTICATION OF DEVICES IN A WIRELESS NETWORK

(75) Inventors: Harsh Dhand, Mohali (IN); Shinivasa Rao, Novva (IN)

(73) Assignee: NXP, B.V., Eindhoven (NL)

( * ) Notice: Subject to any disclaimer, the term of this patent is extended or adjusted under 35 U.S.C. 154(b) by 46 days.

This patent is subject to a terminal disclaimer.

(21) Appl. No.: 13/412,929

(22) Filed: Mar. 6, 2012

(65) Prior Publication Data
US 2012/0167192 A1  Jun. 28, 2012

Related U.S. Application Data

(63) Continuation of application No. 12/299,637, filed as application No. PCT/IB2007/051350 on Apr. 16, 2007, now Pat. No. 8,151,319.

(30) Foreign Application Priority Data

May 5, 2006 (EP) .................................. 06113560

(51) Int. Cl.
*G06F 7/04* (2006.01)
*H04W 12/10* (2009.01)
*G06F 21/43* (2013.01)
*G06F 21/60* (2013.01)

(52) U.S. Cl.
CPC .............. *H04W 12/10* (2013.01); *G06F 21/43* (2013.01); *G06F 21/60* (2013.01); *Y10S 705/907* (2013.01)
USPC .......... 726/3; 726/1; 726/19; 713/2; 713/169; 713/186; 455/41.1; 705/907

(58) Field of Classification Search
CPC ..... H04W 12/02; H04W 12/04; H04W 12/06; H04W 12/08; H04W 12/10; H04W 48/00; G06F 21/31; G06F 21/43; G06F 21/60

USPC ........ 726/1–5, 19; 713/182, 2, 150, 168–169, 713/155, 186; 455/41.1; 705/905–908
See application file for complete search history.

(56) References Cited

U.S. PATENT DOCUMENTS

| | | |
|---|---|---|
| 6,381,467 B1 | 4/2002 | Hill et al. |
| 2002/0055989 A1 | 5/2002 | Stringer-Calvert et al. |

(Continued)

FOREIGN PATENT DOCUMENTS

| | | |
|---|---|---|
| EP | 1545069 A1 | 6/2005 |
| WO | 03061176 A2 | 7/2003 |
| WO | 2005094474 A2 | 10/2005 |

OTHER PUBLICATIONS

S.Krishnamurthy; et al.; "Context-Based Adaptation of Mobile Phones Using Near-Field Communication"; Mobile and Ubiquitous Systems—Workshops, 2006. 3rd Annual International Conference on Digital Object Identifier: 10.1109/MOBIQW.2006.361722; Publication Year: 2006 , pp. 1-10.*

(Continued)

*Primary Examiner* — Hadi Armouche
*Assistant Examiner* — Angela Holmes

(57) ABSTRACT

Various aspects are discussed, for example, a method is described for authentication of devices in a wireless network involving NFC (Near Field Communication), wherein
a device periodically switches its mode from a read mode, in which it is able to receive authentication data from one or more other devices, to a write mode, in which it sends out authentication data to the one or more other devices, according to a random time slot scheme,
the device authenticates itself after having received authentication data from another device during the read mode, and
the device switches permanently its mode to the write mode after being authenticated.

17 Claims, 2 Drawing Sheets

(56) References Cited

U.S. PATENT DOCUMENTS

| | | | |
|---|---|---|---|
| 2004/0143750 A1* | 7/2004 | Kulack et al. | 713/200 |
| 2005/0114650 A1 | 5/2005 | Rockwood et al. | |
| 2005/0283619 A1* | 12/2005 | Min | 713/182 |
| 2007/0145124 A1* | 6/2007 | Handa et al. | 235/380 |
| 2009/0100516 A1* | 4/2009 | Ray et al. | 726/19 |

OTHER PUBLICATIONS

C.Y. Leong; et al.; "Near Field Communication and Bluetooth Bridge System for Mobile Commerce"; Industrial Informatics, 2006 IEEE International Conference on Digital Object Identifier: 10.1109/INDIN.2006.275716; Publication Year: 2006, pp. 50-55.*

Zaruba, Gergely V, et al; "Bluetrees-Scatternet Formation to Enable Bluetooth-Based Ad Hoc Networks"; Proceedings of IEEE International Conference on Communications (ICC 2001); pp. 273-277, 2001.

Asthana, S, et al; "Enabling Secure Ad-Hoc Group Collaboration Over Bluetooth Scatternets"; Proceeding of the 4th IEEE International Workshop on Applications and Services in Wireless Networks (ASWN'04); Aug. 2004.

* cited by examiner

AUTHENTICATION OF DEVICES IN A WIRELESS NETWORK

RELATED PATENT DOCUMENTS

This patent document is a continuation under 35 U.S.C. §120 of U.S. patent application Ser. No. 12/299,637 filed on Jan. 21, 2009 now U.S. Pat. No. 8,151,319, which is a 35 U.S.C. §371 national stage entry of International Application No. PCT/IB2007/051350 filed on Apr. 16, 2007, which claims priority benefit under 35 U.S.C. §119 of European Patent Application No. 06113560.4 filed on May 5, 2006, to which priority is also claimed here.

FIELD OF THE INVENTION

The invention relates to an authentication of devices in a wireless network, particularly a near field communication (NFC) network using an on-the-fly master-slave communication framework.

BACKGROUND OF THE INVENTION

Nowadays many modern mobile devices such as a mobile phone or a personal digital assistant (PDA) are supporting more and more different data communication modes. For example, a modern mobile device can support the Bluetooth communication mode and one or more wireless local area network (LAN) modes. These modes allow to integrate the device into a network, such as a Personal Area Network (PAN) or a LAN.

Furthermore, the mobile devices are becoming personalized, i.e. each person carries her or his own mobile phone, PDA, laptop, etc.

The increasing number of these devices also results in greater numbers of devices being lost. Today, more important than the monetary value of these devices is the data which could be accessed by a third person, if he gets your device. Several solutions to the security of such personal mobile devices integrated into a LAN or PAN have been proposed, wherein the user is provided with a master key or card, which allows to access and use his/her other products such as a printer or a data storage center and to exchange personal data with trusted devices.

However, this requires that the user has to carry the master key or card everywhere, and the loss of the master key or card would lead to potential security threat for the rest of the equipment. Furthermore, the user may be incapable of using his/her own equipment, at least for some time. Particularly in business environments with security authorities, this might lead to a further problem when the user is unable to use his/her mobile phone since she/he lost his/her central master key. In such a case, the user would be unable to contact the security authorities, and hence would not be able to quickly recover the master key.

All these limited solutions arise because of the limitation of the known data communication protocols which require to have a sender and a receiver, and hence when translated into an authentication mechanism, a master-slave set-up. This means that a device must establish a master-slave connection with a central master station and authenticate itself with the central master station by using a master key or card.

US 2005/0114650A1 discloses a hybrid authentication method between nodes of a network, wherein a central and a distributed infrastructure for authentication of nodes for integration into the network are provided. Authentication of nodes of the network may be performed with support from either the distributed infrastructure or the central infrastructure, thus alleviating the above mentioned drawback of wireless networks in which authentication requires a central master station.

OBJECT AND SUMMARY OF THE INVENTION

It is an object of the invention to provide an improved authentication of devices in a wireless network.

In order to achieve the object defined above, with a method for authentication of devices according to the invention, characteristic features are provided so that a method for authentication of devices in a wireless network according to the invention can be characterized in the way defined below, that is:

a device is operated in an authentication mode in which it periodically switches from a read mode, in which it is able to receive authentication data from one or more other devices, to a write mode, in which it sends out authentication data to the one or more other devices and vice versa according to a random time slot scheme, the device authenticates itself after having received authentication data from another device during the read mode, and the device switches permanently its mode to the write mode after being authenticated.

In order to achieve the object defined above, with a system for authentication of devices according to the invention, characteristic features are provided so that a system for authentication of devices in a wireless network according to the invention can be characterized in the way defined below, that is:

the system comprises at least two devices each comprising an authentication mode in which a device periodically switches its mode from a read mode, in which it receives authentication data from one or more other devices, to a write mode, in which it sends out authentication data to the one or more other devices, according to a random time slot scheme, wherein in the system one of the at least two devices authenticates itself after having received authentication data from another device during the read mode, and the device switches permanently its mode to the write mode after being authenticated.

The characteristic features according to the invention provide the advantage that authentication may be performed without requiring a central server with an authentication database by every device that has the authentication mode. In other words, each device having the authentication mode may serve as a kind of master station for another device's authentication. Thus, it is possible to form a trusted wireless network with at least two devices. This wireless network formed is an authenticated network configured "on-the-fly", which does not require a complex network infrastructure with a central authentication server that may fail and render authentication impossible. The invention also allows to form very reliable wireless networks since a failure of one device does not block the authentication in the network. Furthermore, the invention does not require a static initial state of a network, i.e. an existing network infrastructure such as a central station or server. It allows to form wireless networks dynamically from scratch, i.e. without any existing network infrastructure. The invention may, for example, be implemented as part of the application software of a microcontroller of a smart card, of a microprocessor of a PDA or as part of the operating system of a PDA.

According to an embodiment of the invention, the device may enter the authentication mode after being powered on.

Thus, when switching on a device, the device enters the authentication mode in which it is able to authenticate itself with for example other devices in its neighbourhood. This allows to quickly incorporate the device into a wireless network.

According to a further embodiment of the invention, the device may enter the authentication mode after a pre-specified application is started. Such a pre-specified application may be for example an application for transmitting personal and/or secure data to another device or more generally speaking any application with a network access which should be secure, i.e. authenticated, in order to avoid that personal, private, and secure data may be tapped.

In order to enhance security, according to an embodiment of the invention, the device may enter a further authentication mode when it is shut down, in which it authenticates the shutdown operation. Thus, a user switching off his/her device and leaving it on a desktop can prevent that another, unauthorized person takes his/her device, switches it on and has immediate access to the network. The authentication at shutdown of a device may, for example, be implemented in that a device checks at shutdown a trusted group of devices around, and disables certain key features for the next boot up of the device if the authentication is not done with the trusted group around. This is similar to privileges. So some of the highly privileged applications or programs of the device may not function in the next boot up if the shutdown is not authenticated, thus preventing unauthorized forcible shutting down of the device and reusing it as a different user.

According to an embodiment of the invention, the authentication data may comprise an identifier for signalling the data type and an encrypted user ID. This enables other devices to quickly detect authentication data, particularly if these devices are in the authentication mode.

According to a further aspect, the invention relates to a wireless network device which has an authentication protocol that is provided to operate the device in an authentication mode in which it periodically switches from a read mode, in which it is able to receive authentication data from one or more other devices, to a write mode, in which it sends out authentication data to the one or more other devices, and vice versa according to a random time slot scheme, wherein the device is adapted to authenticate itself after having received authentication data from another device during the read mode, and wherein the device is further adapted to switch permanently its mode to the write mode after being authenticated.

According to an embodiment of the invention, the authentication protocol may be implemented in the device as part of an application or an operating system of the device.

According to an embodiment of the invention, the device is adapted to initiate the authentication protocol after power-on of the device.

According to an embodiment of the invention, the device is adapted to initiate the authentication protocol after launching an application on the device.

The device may be for example a mobile phone with wireless network capabilities, a personal digital assistant with wireless network capabilities, or a smart card with wireless network capabilities.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

FIG. 2 shows a flowchart of an embodiment of an authentication of two devices according to the invention, when these devices are switched on.

DESCRIPTION OF EMBODIMENTS

In the following, the invention is explained with regard to Near Field Communication (NFC). NFC is a proximity-based, ultra low-power, single-chip wireless technology that allows information to be transmitted between devices over a distance of up to 10 cm (4 inches). For most wireless applications this ultra-short range would be considered a distinct disadvantage, but for NFC it is one of its greatest strengths. Ultra-short range not only means that devices must be placed intentionally close together in order to communicate, it also makes the resulting exchange of information inherently secure.

Although the invention is explained with regard to NFC, it should be noted that it is applicable to any wireless communication standard, particularly to WLAN standards, but also to the above mentioned mobile radio communication standards.

As explained above, using NFC has the distinct advantage especially in authentication applications because
  i. Being short range, it requires the devices to be very close together and hence ensures that only the user is doing it.
  ii. The encrypted data also ensures that sniffing and hacking the data used for authentication is not possible.

The devices, or communication devices mentioned herein are capable of both reading data and writing data over a radio frequency (RF) interface for NFC. Thus, each device comprises an NFC module with an RF interface. The capability of reading and writing is necessary in order to allow an authentication according to the invention, since if a first device is writing, then only if a second device is in the read mode, a communication between the two devices will take place and vice versa. Hence for any form of authentication according to the invention, the identification of a reader and a writer is required. However, for establishing a communication for authentication, the prior information about who the reader and writer is, is not necessary, as will become clearer from the following description.

Figure 1:
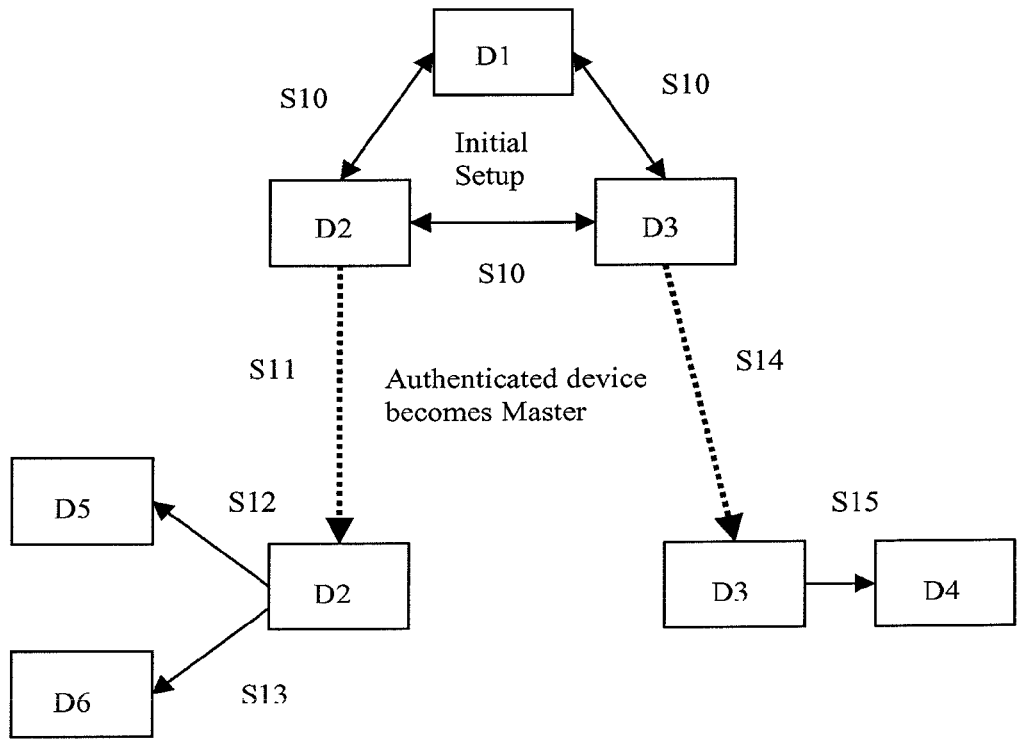
FIG. 1 shows an exemplary sequence of an authentication of devices in a wireless network according to the invention.

FIG. 1 shows a sequence of authentication of three devices D1, D2, and D3. In the initial setup step S10, each of the devices D1 to D3 periodically switches its mode from a read mode, in which it receives authentication data from one or more other devices, to a write mode, in which it sends out authentication data to the one or more other devices, according to a random time slot scheme. This initial mode in which the devices change from a read to a write mode and vice versa is also called the authentication protocol or briefly protocol in the present document. Thus, in the initial setup all devices D1 to D3 perform the authentication protocol in order to form a kind of authenticated network "on the fly". "On the fly" describes activities that develop or occur dynamically rather than as the result of something that is statically predefined. It should be observed that hitherto networks with an authentication mechanism have required a master-slave configuration and are therefore static instead of dynamic as the approach of the present invention is. In the protocol, data is exchanged, i.e. each device momentarily exchanges information arbitrating for the connection establishment. There is no requirement to specify beforehand which device is the master device and which is the slave device. Instead, the devices alternate their modes to set up the authentication.

In step S11, device D2 is authenticated because this device receives a user ID as authentication data from any of the other devices D1 or D3. Device D2 compares the received user ID with a stored user ID and authenticates itself if the comparison result shows that both user IDs are identical. After authentication, device D2 may now operate as a kind of master and authenticate other devices such as device D5 (step S12) and device D6 (step S13). In step S14, device D3 is authenticated by one of the other devices D1 or D2 similar to the authentication of device D2, and, thus, may operate as master and authenticate another device such as device D4 in step S15. The sequence of authentication of devices described above demonstrates how a reliable authenticated wireless network may be formed "on the fly" without requiring a central master station for authentication.

Figure 2:
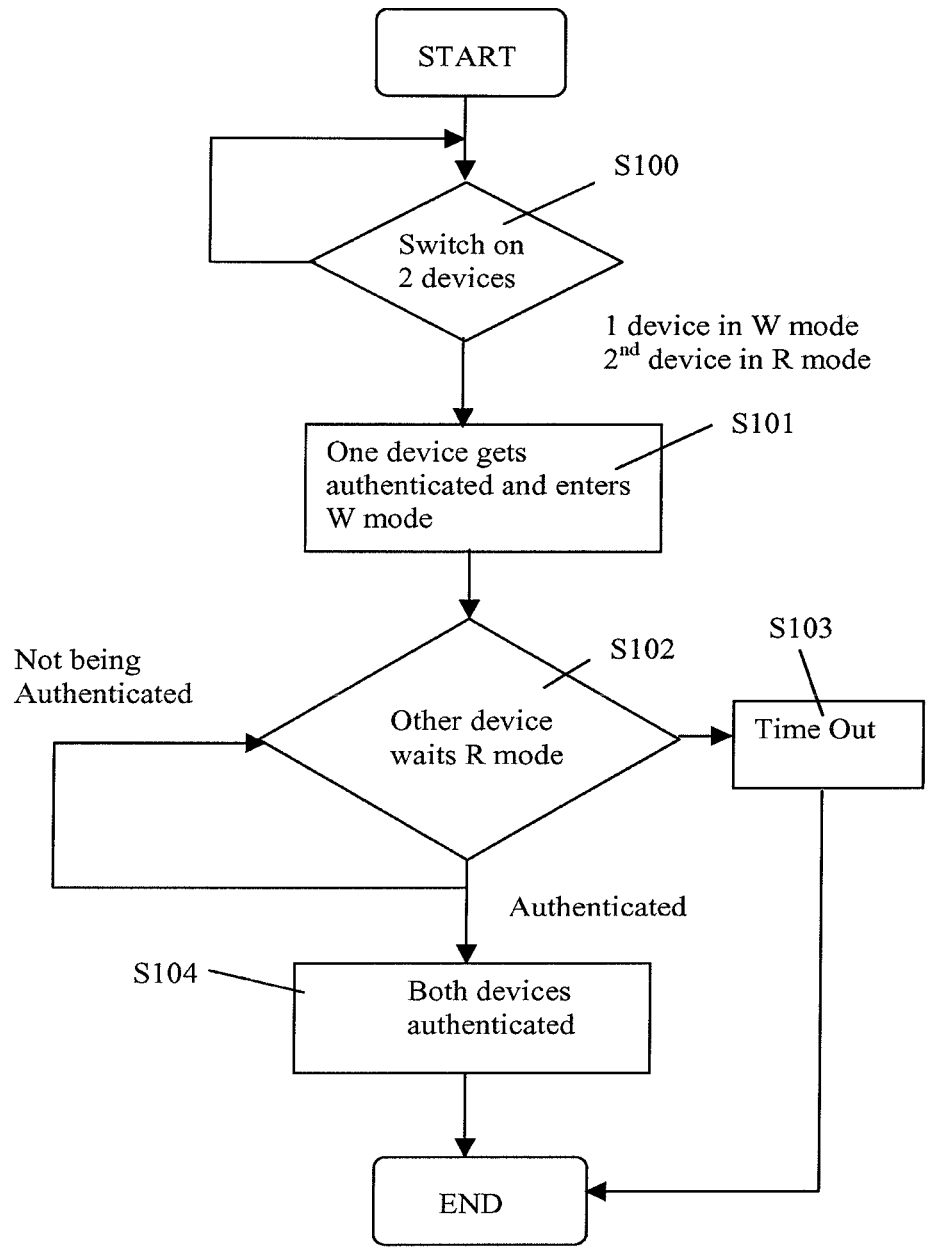

FIG. 2 shows a flowchart of the authentication of two devices according to the invention, when these devices are switched on. In step S100 it is checked whether the two devices are switched on and whether one device is in the read mode and the other device is in the write mode. If both devices are switched on and one device is in the read mode and the other is in the write mode, an authentication of the device in the read mode is performed and this device enters the write mode (step S101). In the following step S102, it is checked whether the other device is in the read mode after a certain period. If the device does not switch into the read mode, a time out is performed in step S103, meaning that this device is not authenticated. Otherwise, i.e. when the device switches to read mode within the given period, an authentication is tried by receiving authentication data from the device already authenticated and comparing it with stored authentication data. If the two authentication data match, for example are identical, the device becomes authenticated and switches into the write mode, step S104. Otherwise, i.e. if authentication fails, for example because the authentication data did not match, the device remains in the read mode and the check in step S102 is performed until a time out occurs.

Figure 3:
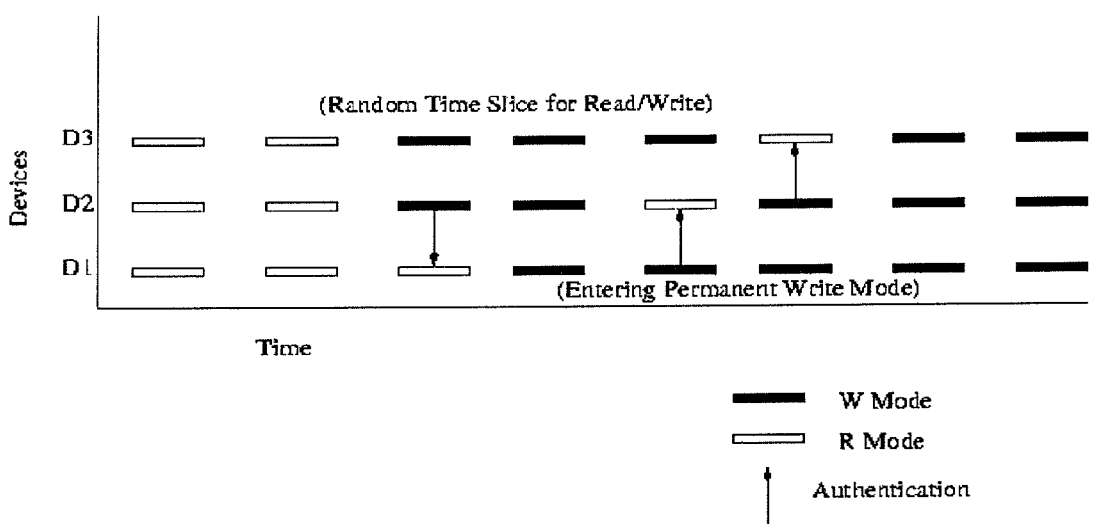
FIG. 3 shows in a timing diagram an exemplary sequence of an authentication of three devices of a wireless network according to the invention.

FIG. 3 shows a timing diagram with the authentication sequence or process according to the invention. Three devices D1 to D3 are switched on initially and, thus, perform the protocol, i.e. change their modes between read and write mode with random time slots/slices for each mode. After switching on, each device D1 to D3 is in the read mode, i.e. is ready to receive data over its RF interface. In the second time slot, each device D1 to D3 is still in the read mode, but in the third time slot the devices D2 and D3 switch from the read to the write mode and send out their authentication data over their RF interfaces. Device D1 which, in the third time slot, is still in the read mode, receives in step S1 the authentication data sent out from device D2 and compares the received data with stored authentication data. If the received data are identical to the stored data, device D1 becomes a master for authentication and switches permanently to the write mode in which it sends out its authentication data during the fourth, fifth, sixth, and further time slot. This mode is also called the permanent write mode. In the fourth time slot, all devices D1 to D3 are in the write mode so that none of the devices D2 and D3 may become authenticated. Then, in the fifth time slot, device D2 switches to the read mode and receives in step S2 authentication data from device D1, the master device. After comparing the received data with its stored authentication data and confirming identity, device D2 also becomes a master device and switches permanently to the write mode. Finally, in the sixth time slot, also device D3 switches to the read mode and receives authentication data from device D2 in step S3. After confirming identity of the received data and stored authentication data, device D3 becomes a master.

An embodiment of authentication steps according to the invention are now explained by means of two devices D1 and D2.

In the beginning, it is assumed that both devices D1 and D2 are initially switched off. For switching on one of the devices, authentication from the other device is required in order to form a wireless network. For example, for switching on device D1 to complete functionality, it is required that device D2 supplies a user ID and vice versa for authentication.

According to the invention, for allowing an authentication "on the fly", the devices are adapted to use a communication protocol of randomly and simultaneously running read and write commands in batches (read and write mode) in order to enable dynamically an authentication of both devices D1 and D2 for forming a wireless network, when both devices D1 and D2 are switched on simultaneously.

In a first step, device D1 is switched on. The device goes into write (n1 times) and read (n2 times) mode. n1, n2 are random numbers in a certain range. Read mode means a mode in which the device is in a receiving mode for reading data sent out by other devices. Write mode means a send mode for sending out data to the other devices. The data sent out in the write mode are authentication data such as a user ID. Since n1 and n2 are random numbers, there is a certain likelihood after switching on the devices that one device will be in the read mode while the other one will be in the write mode. The switching from write to read mode may, for example, be implemented in an application executed by a device. The switching may not only be initiated at power-on but also when an application is started on the devices, which requires a network access, for example an e-mail client, network print process, etc. Another device D2 may be simultaneously powered on and be in Step 1 mode. Generally, each device will mutually authenticate any other device (in Step 1) of the same user. If the number of reads and writes are randomly chosen, there occurs a time when device D1 is in the read mode, device D2 is in the write mode or vice versa and it is during this time that the reading device gets authenticated and enters a second step.

In the second step, every authenticated device goes into write mode indefinitely. So this device acts as an eligible authenticator for an unauthenticated device.

In a third step, it is assumed that a user wants to use his/her device (or some functionality). The device goes into read mode, waiting for authentication from an eligible authenticator, i.e. another device which is in the write mode.

In a fourth step, a decision is made in that if an authentication is unsuccessful within a predetermined time out period, the device goes into step 1 and switches randomly between read and write mode. However, if authentication is successful, the device goes into the permanent write mode and also allows the user to use the functionality.

In a last step, for completion of functionality, the device goes to the second step, waiting for another use, while also being ready to authenticate any other device.

Various embodiments of the above described protocol would depend on the desired level of security. The authentication taking place via the above-mentioned protocol might be for a specified interval of time, after which a user needs to again bring his/her device close by, i.e. within the radio range of the wireless network and hence validate his/her identity. This overcomes the problem that many other security systems face, i.e. if the device is stolen in the on-mode, there is a chance that all the data of the user on the device are stolen, and also that the unauthorised user can continue using the device, if he ensures that the device is not turned off.

Another level of security can be added to user specified applications. Suppose the user gives the device to his/her friend or relative and does not want certain key applications to be run by them, then these applications have to be preceded by a so-called reader application for implementing security, which would wait for the authentication by another device serving as a writer, i.e. sending out authentication data.

To prevent unauthorized users from switching off the device and using it again, via a different login, the switching off may also be provided with an authentication according to the invention. Again a device has to be brought near, i.e. within the radio range to switch off the device. Just like the booting up, where the first device is to be booted up, alternating read and write requests are used for authentication in order to perform a kind of logout of the device from the wireless network. The authentication required for switching off can be provided by any other device even if switched off because the initial functionality of the device is to alternately write and read data.

The mechanism of authentication according to the invention is especially useful in situations where the authentication has to be "carried" to some other place. The protocol according to the invention ensures that both the situations shown in FIG. 1 are catered for. Initially devices D1, D2 and D3 are switched off and come into each other's vicinity, they authenticate each other after switching on in step S10, the order of which is non-deterministic. The end result is that all devices D1 to D3 are authenticated. Now devices D2 and D3 can be considered to be masters and used to authenticate other devices as shown in the lower left and lower right parts of FIG. 1. In step S11, device D2 serves as master for devices D5 and D6, which are authenticated in steps S12 and S13, respectively, by device D2. In step S14, device D3 serves as master for a further device D4, which is authenticated in step S15. The timing and functionality for which the authenticated devices become masters is also communicated in the initial set-up.

The invention has applications for establishment of an authenticated system based on a read-write protocol, which may be implemented in a data communication protocol. The specific case presented was for authentication of one device using another device and hence allows a user to make his device work only in the vicinity of the other. This allows for theft prevention and also provides user flexibility to share his mobile device with friends, etc, protecting just his key applications.

The invention has several advantages over other mobile device security solutions. Firstly, the invention does not require the presence of a master authenticator: any of the devices serves the purpose of authenticating another device. The invention may be based on currently existing communication protocols and hence may be implemented at low cost. Furthermore, the invention provides the addition of extra flexibility in terms of time of access and permissions of access.

The invention claimed is:

1. An apparatus comprising:
a chip configured and arranged to communicate using near field communication (NFC) and implement a bi-directional authentication process that includes
a read mode in which the chip operates to
receive an authentication identification;
compare the received authentication identification to stored authentication identification on the chip; and
authenticate the apparatus based upon the comparison of the received authentication identification to the stored authentication identification; and
a write mode in which the chip operates to
access the stored authentication identification; and
transmit the authentication identification to a second chip operating in the read mode, wherein in the read mode, the chip is further configured and arranged to attempt the bi-directional authentication process until the apparatus is authenticated or until a time out occurs; and
the chip is further configured and arranged to alternate between the read mode and the write mode until the apparatus is authenticated in read mode and thereafter to remain in write mode.

2. The apparatus of claim 1, wherein the chip is further configured and arranged to alternate between the read mode and the write mode at random intervals.

3. The apparatus of claim 1, wherein the chip is further configured and arranged to enter the read mode after a pre-specified application has started, and the chip and the second chip are configured and arranged to exchange information arbitrating for establishing a connection therebetween prior to implementation of the bi-directional authentication process.

4. The apparatus of claim 1, wherein the chip is further configured and arranged to enter a second authentication mode when it is shut down, in which the shutdown operation is authenticated.

5. The apparatus of claim 1, wherein the authentication identification includes an identifier for signalling a type of data and an encrypted user ID.

6. The apparatus of claim 1, wherein the chip is further configured and arranged to operate in the read mode for a predefined period.

7. The apparatus of claim 1, wherein the apparatus is a mobile phone, a personal digital assistant, or a smart card.

8. An apparatus comprising:
a chip configured and arranged to
communicate using near field communication (NFC),
implement an authentication protocol that includes an authentication mode in which the chip periodically switches from a read mode, in which it is configured to receive authentication data from a second chip, to a write mode, in which it is configured to send out authentication data to the second chip according to a random time slot scheme, and
to authenticate itself after having received authentication data from the second chip during the read mode and switch permanently to the write mode after being authenticated, wherein in the authentication mode, the chip is further configured and arranged to attempt the authentication process until the apparatus is authenticated or until a time out occurs.

9. The apparatus of claim 8, wherein the authentication protocol is implemented as part of an application or an operating system of the apparatus.

10. The apparatus of claim 8, wherein the authentication protocol includes an identifier for signalling a type of data and an encrypted user ID, and the chip and the second chip are configured and arranged to exchange information arbitrating for establishing a connection therebetween prior to implementation of the authentication mode.

11. The apparatus of claim 8, wherein the chip is further configured and arranged to operate in the read mode for a predefined period.

12. The apparatus of claim 8, wherein the chip is further configured and arranged to enter a second authentication mode when it is shut down, in which the shutdown operation is authenticated.

13. The apparatus of claim 8, wherein the apparatus is a mobile phone, a personal digital assistant, or a smart card.

14. A system comprising:
   at least two chips configured and arranged to communicate using near field communication (NFC) and implement a bi-directional authentication process that includes
   a read mode in which a chip operates to
      receive an authentication identification from at least a second one of the at least two chips;
      compare the received authentication identification to authentication identification stored on the chip; and
      authenticate the chip based upon the comparison of the received authentication identification to the authentication identification stored on the chip; and
   a write mode in which the chip operates to
      access stored authentication identification; and
      transmit the authentication identification to a chip operating in the read mode; and
   the chips are further configured and arranged to alternate between the read mode and the write mode until the chips are authenticated in read mode and thereafter to remain in write mode, and to alternate between the read mode and the write mode at random intervals, to remain in read mode, and attempt the bi-directional authentication process until at least one of the two chips is authenticated and/or until a time out occurs.

15. The system of claim 14, wherein the authentication identification includes an identifier for signalling a type of data and an encrypted user ID.

16. The system of claim 14, wherein the chips are further configured and arranged to enter the read mode after being powered on, and the chip and the second one of the at least two chips are configured and arranged to exchange information arbitrating for establishing a connection therebetween prior to implementation of the bi-directional authentication process.

17. The system of claim 14, wherein the chips are further configured and arranged to operate in the read mode for a predefined period.

* * * * *